United States Patent Office 2,803,555
Patented Aug. 20, 1957

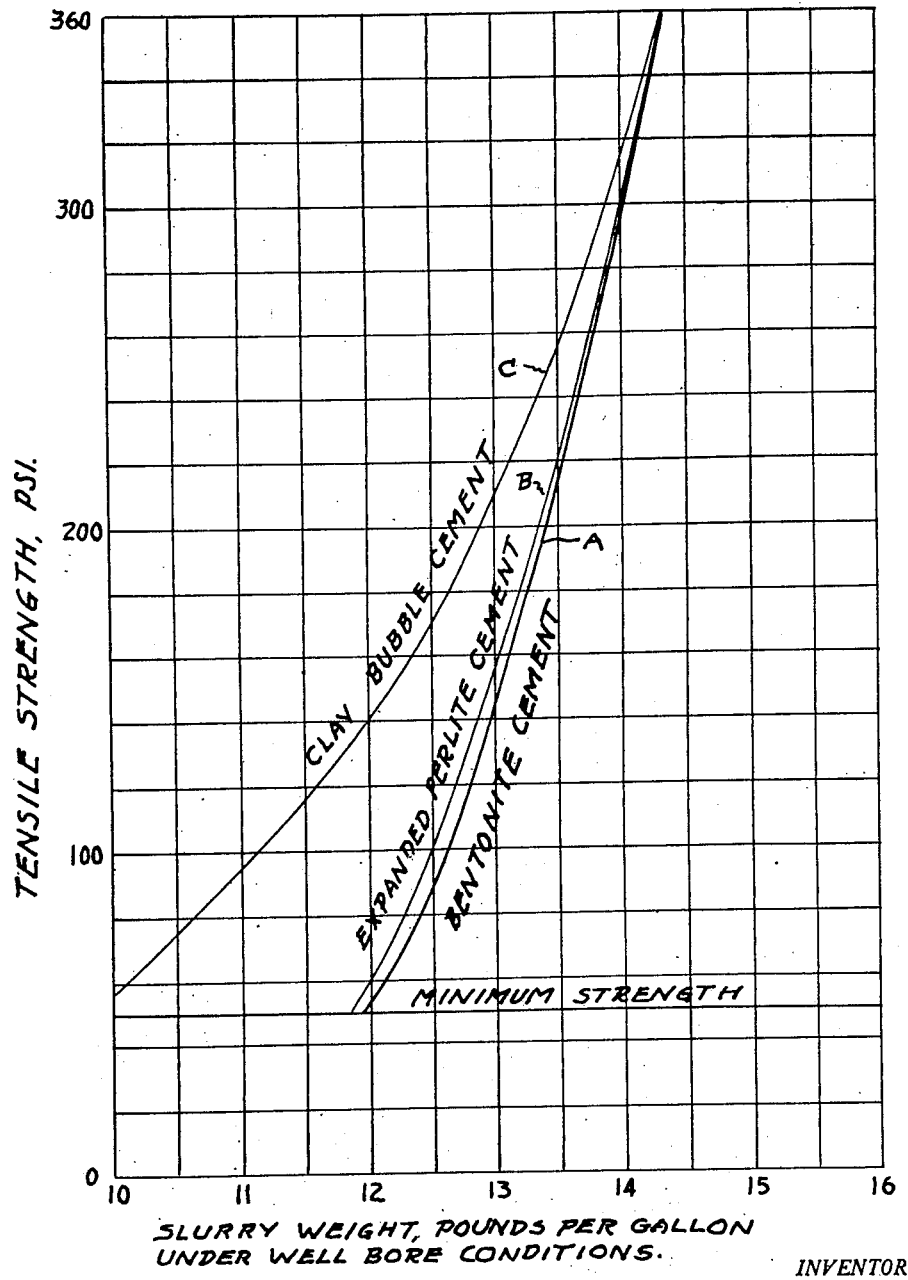

2,803,555

LIGHT WEIGHT WELL CEMENT

Roscoe C. Clark, Jr., Henry F. Coffer, and D'Arcy A. Shock, Ponca City, Okla., assignors to Continental Oil Company, Ponca City, Okla., a corporation of Delaware Application October 21, 1953, Serial No. 387,482

6 Claims. (Cl. 106—97)

This invention relates to improvements in cement slurries such as are commonly used in the oil fields for the purpose of cementing or filling the space in a well between the casing and the surrounding formation.

Cements of this kind are usually of the hydraulic setting type and are prepared in the form of a pumpable slurry which is then introduced into the well through the casing or a pipe in the well so that the introduced cement slurry will rise in the space between the casing and the surrounding formation. Such a slurry generally comprises a hydraulic cement and water, and sometimes fine granular solids which are not to be confused with coarse aggregates employed in structural concretes.

It is evident that the depth at which the cementing operation is performed will determine the static pressure head and therefore the pressure to which the slurry must be subjected in bringing it into place. The density, or weight of the slurry per unit volume, is accordingly very important since it is frequently desirable to maintain at a very minimum the pressure which a column of the slurry exerts on the surrounding formation, since if the pressure rises to too high a value, fracturing of a formation may occur leading to an undesirable cementing of the formation, and in some instances does not prevent communication between the uncemented formations behind the casing as intended.

It is a particular object of this invention to provide an improved oil well cement slurry which is particularly characterized in having a low density at pressure conditions prevailing in a well, and which when set and cured into a solid mass has all the other properties required of an oil well cement.

There have been numerous efforts in the prior art seeking to produce light weight well cement slurries, and while a reasonable degree of success has been achieved, none of the prior art efforts have been able to produce a cement slurry of the low density which characterizes the present invention.

The principal efforts along this line have been to include in the cement slurry powdered or granular materials such as bentonite and expanded perlite. These materials are effective to reduce to a certain extent the density of the slurry, but their use is attendant with certain disadvantages.

Ordinary slurries of cement and water have a density of about 15-16 lbs. per gallon. When bentonite is used in such a slurry, the use of the amounts necessary to effect an appreciable reduction in weight, say to about 12-13 lbs. per gallon, is ordinarily accompanied by such a reduction in the ultimate strength of the final cement, that this is the limit to which the density can be usefully reduced. Furthermore, increasing amounts of bentonite require for a pumpable slurry additional quantities of water to make up for the amount that is so readily absorbed by the bentonite. While this additional proportion of water reduces the density of the slurry a little because the density of the water is less than that of the remaining components of the slurry, nevertheless, this exceeds the upper limit of water to cement ratio for maximum strength which can be tolerated. When using only bentonite in a cement-water slurry, theoretically in order to produce a slurry weighing ten pounds per gallon, it would be necessary to use thirty gallons of water per sack of cement which would produce a highly diluted suspension entirely unusable as a cement slurry, and the dried cement mass therefrom would, of course, crumble very much like a lump of dried sand.

When using expanded perlite in the cement-water slurry, its use has two disadvantages, namely, its effect on the reduction in the strength of the ultimate cement is even greater than from bentonite. Moreover such perlite slurries exhibit a high degree of compressibility when placed under the pressures prevailing under well bore conditions. For example, such a perlitic slurry having a density of 11.2 lbs./gal. as made up under atmospheric pressure conditions, was found to have a density of 12.3 lbs./gal. when subjected to a pressure of 5,000 p. s. i. such as may readily prevail under field cementing conditions.

It is a principal object of our invention to provide a cement slurry that has a substantially pressure-stable density which is also considerably lower than any heretofore possible, while at the same time producing a cement which has the desired strength.

It is a further object of the invention to provide a slurry which does not require the use of prohibitive amounts of water, while at the same time possesses low water loss characteristics.

It is still a more particular object of our invention to provide a slurry which can be produced economically, which produces a cement which has all of the required characteristics and which may be manipulated in the field without any difficulty.

Other objects of the invention will appear as the description proceeds.

To the accomplishment of the foregoing and related ends, our invention, then, comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises providing an oil well cement which is formed of a cement slurry which comprises a cellular ceramic aggregate:

| | Percent by weight based on the amount of dry Portland cement |
|---|---|
| (a) Having an absolute apparent specific gravity of less than one; (b) Which will withstand a hydrostatic crushing load of at least 500 p. s. i.; and (c) Having a particle size of about 0.001 to 0.25 inch in diameter, (d) In which substantially all of the passages through the walls surrounding the major portion of the enclosed voids have an effective diameter less than 3 microns | From 2 to 150 |
| Water | From 50 to 150 |
| Pore sealer | From 0.2 to 6.0 | together with minor amounts of such other additives, such as setting retarders, as are sometimes used in hydraulic cement compositions.

In the drawing there is shown graphically the relation between slurry weight under well bore conditions (a pressure of 2,000 p. s. i. g.) vs. tensile strength of the cured cement therefrom. Curves A and B show prior art compositions. Curve C shows the improved characteristics provided by the present invention.

By having reference to the foregoing broad statement of the invention, it will be observed that the cement slurry forming the subject matter of this invention comprises an admixture of a particular type of granular cellular ceramic aggregate and a pore sealer together with a hydraulic cement and water.

It is believed that this invention may best be explained by first defining in detail the types of materials which are useful as the aggregate and the pore sealer.

The cellular ceramic aggregate

As previously indicated, the cellular ceramic aggregate which is used in the production of the cement slurry of this invention must have four primary characteristics, viz., (a) An absolute apparent specific gravity of less than one.
(b) Will withstand a hydrostatic crushing load of at least 500 p. s. i.
(c) A particle size of about 0.001 to 0.25 inch in diameter.
(d) Substantially all of the passages through the walls surrounding the major portion of the enclosed voids have an effective diameter less than 3 microns.

While there have been a number of prior art workers who have sought to produce cellular granular aggregates by various means such as by heat expansion, and by the use of various raw materials, very few of such expanded products will be found useful in the present invention.

The process disclosed in the application, Serial No. 279,093, filed March 28, 1952, by J. D. McLaughlin, which application is now abandoned, may be employed in producing the cellular ceramic aggregates useful in the slurries of this invention. This process is also described in Chemical Engineering, vol. 59, No. 12, December 1952, beginning on page 247.

The aggregate produced by the process referred to above has the requisite properties necessary for use in the present invention in that it has in effect sealed voids or bubbles. These sealed voids are enclosed within walls which have two primary characteristics, first, they must be able to withstand a sufficient hydrostatic crushing strength of at least 500 p. s. i. so as to produce a resultant cured cement mass which has the desired physical strength, and, second, there is a definite limit on the permeability as a function of pressure.

There are several reasons why the bubbles which constitute the fine granular aggregate in the cement slurry of this invention have a sufficiently high crushing strength so that they will not be crushed either during formation of the slurry or placement of the latter in the well. First, the resistance to hydrostatic crushing will insure that the application of high placement loads on the slurry will not displace liquids into, or destroy, the bubbles and accordingly increase the density of the slurry. Second, the wall strength of the bubbles has a definite bearing on the ultimate strength of the concrete formed from the slurry.

When the slurry is to be used in deep wells the crushing strength of the aggregate should be greater than specified above. For instance, where the slurry is to be placed at a depth of 5,000 feet, the granular aggregate should withstand a hydrostatic crushing load of at least 2,600 p. s. i.

Perhaps the greatest and most important characteristic of the cellular aggregate is the factor of the size of the passages which extend through the walls which confine the enclosed voids.

Regardless of the type of process used, in the preparation of the cellular aggregate, there will always be at least a certain percentage of such aggregate in which the walls surrounding the enclosed voids are porous to a degree. While high temperature and other conditions which may be observed in the process of forming the cellular aggregate will tend toward the production of structures in which the enclosing walls are highly vitreous and thus contain only a relatively small number of passages, nevertheless, from a practical operation of any of the processes aforesaid, the ultimate product will usually contain a substantial percentage of individual aggregate particles in which the walls surrounding the enclosed pores or voids have a certain degree of permeability.

At this point, it should be noted that the cellular ceramic aggregates which may be used in this invention may have one or more voids in each discrete particle, that is, the individual particles may be unicellular or multicellular. As indicated above, the passages through the walls which surround the enclosed voids should have an effective diameter less than 3 microns. In this particular, the aggregate used in this invention is clearly distinguishable over prior art aggregates such as expanded perlite. By restricting the use of aggregates to those which have wall passages less than the dimension given above, it is possible to make effective use of pore sealers which is not possible with products such as expanded perlite.

The pore sealers

The pore sealers useful in this invention may be divided into two broad categories, first, those which function by themselves into this capacity, and, second, those which are believed to function because of the presence in the slurry of the hydraulic cement.

A notable example of the first class of pore sealers which are effective when used alone is bentonite, or any of the allied types of clay.

In the compounding of the slurries of the present invention, it was unexpectedly discovered that a small concentration of bentonite in the slurry was effective to seal the pores or passages in the walls surrounding the enclosed voids of the aggregate so that, when the aggregate was subjected to extremely high pressures on the order of two to five thousand pounds per square inch, such pressures were still not effective in causing any substantial penetration of water into the bubbles as evidenced by the amount of water necessary in order to maintain the required fluidity.

A pore sealer which is representative of the second type referred to above, i. e., which works in conjunction with another component of the slurry such as the hydraulic cement, is polyvinyl alcohol. The precise manner in which the polyvinyl alcohol functions is not thoroughly understood and it is believed unnecessary to be able to explain it. It is known that the very finely divided hydraulic cement in the slurry is not by itself effective as a pore sealer, however, a small amount of polyvinyl alcohol on the order of from .2 to .6 percent based on the weight of the dry hydraulic cement, is sufficient to create a condition at the interface which results in a sealing of the passages into the voids in the aggregate.

The foregoing is an indication of the types of materials which may be used as pore sealers. There are of course a number of other materials which have been used heretofore in low fluid loss cement and such materials will likewise be found to be of utility as pore sealers in the cement slurries of this invention, although bentonite and polyvinyl alcohol are preferred. Of the additional materials which may be used for this purpose, may be mentioned pregelatinized starch.

All of these pore sealers have a common characteristic in that their presence results in the formation of a mucilaginous film on the surface of the cellular ceramic aggregate.

The cement

Any of the wide variety of commercially available hydraulic cements may be used in producing the slurries of this invention. The American Society for Testing Materials have established a classification for Portland cements and of those, classes I, II, and III will usually be found to give best results, together with a special type of cement which is known in the oil fields as "Oil well slow set cement."

The water

The water used should have a reasonable degree of purity, although for certain purposes, certain electrolytes may be used in the water for the purposes for which those materials are commonly employed. For example, when operating in cold weather, it is customary many times to add enough sodium chloride to the water so as to lower the freezing point of the slurry.

Specific examples

Below are given six specific embodiments of admixtures which have been found to be satisfactory low density cement slurries for use in cementing oil wells. Examples 7, 8 and 9 are illustrative of an ordinary cement and water slurry and such a cement slurry to which bentonite and the clay bubble aggregate has been added respectively.

| Ex. No. | Percent by Weight of Dry Portland Cement | | | | Slurry Weight, lbs./gal.¹ | 24 hr. Tensile Strength, p.s.i., Curing Temp., 100° F. |
|---|---|---|---|---|---|---|
| | Polyvinyl alcohol | Bentonite | Water | Aggregate | | |
| 1 | | 4 | 84 | 25 | 12.2 | 150 |
| 2 | .4 | | 70 | 50 | 12.5 | 170 |
| 3 | | 4 | 98 | 50 | 11.6 | 120 |
| 4 | .4 | | 84 | 75 | 11.5 | 115 |
| 5 | | 4 | 118 | 75 | 10.8 | 80 |
| 6 | | 4 | 146 | 100 | 10.5 | 75 |
| 7 | | | 116 | | 15.6 | 250 |
| 8 | | 12 | 130 | | 12.2 | 50 |
| 9 | | | 93 | 50 | 14.0 | 130 |

¹ At a pressure of 5,000 p. s. i.

The term absolute apparent density as used in this description and in the appended claims is intended to mean the density of the entire undisturbed and uncrushed aggregate particles exclusive of the air spaces between the aggregate particles.

Other modes of applying the principle of the invention may be employed, change being made as regards the details described, provided the features stated in any of the following claims or the equivalent of such be employed.

We therefore particularly point out and distinctly claim as our invention:

1. Portland cement slurry having a maximum density of 11½ lbs. per gallon when subjected to hydrostatic pressure of 2000 p. s. i. g., wherein the cured cement derived therefrom, by curing 24 hours at 100° F., has a minimum tensile strength of 50 p. s. i. comprising Portland cement and a unicellular ceramic aggregate, having an absolute apparent specific gravity of less than one, is spherical, and has a maximum diameter in the range of from .001 to .25 inch, which will withstand a hydrostatic crushing load of at least 2000 p. s. i., and in which substantially all of the passages through the walls surrounding the major portion of the enclosed voids have an effective diameter of less than 3 microns from 2% to 150%; water 50% to 150%; and a gelatinizing clay from .2% to 6%, said percentages being by weight based on the amount of the dry Portland cement.

2. A cement slurry in accordance with claim 1, characterized further in that said pore sealer is bentonite used in combination with polyvinyl alcohol in the relative proportions of 9 parts of bentonite to 1 part polyvinyl alcohol.

3. A cement slurry in accordance with claim 1, characterized further in that said gelatinizing clay is bentonite.

4. A cement slurry in accordance with claim 1, characterized further in that said gelatinizing clay is bentonite and present in the range of from 2% to 6% based on the amount of cement present.

5. A cement slurry in accordance with claim 1, characterized further in that said gelatinizing clay is a polyvinyl alcohol and present in an amount of from about .2% to .6% based on the amount of cement present.

6. As a new composition of matter a hardened concrete formed from a cement slurry as defined in claim 1.

References Cited in the file of this patent

UNITED STATES PATENTS

| | | |
|---|---|---|
| 1,710,921 | Cross | Apr. 30, 1929 |
| 2,136,096 | Benner et al. | Nov. 8, 1938 |
| 2,285,302 | Patterson | June 2, 1942 |
| 2,340,194 | McMullen | Jan. 25, 1944 |
| 2,517,993 | Falco | Aug. 8, 1950 |
| 2,695,669 | Sidwell | Nov. 30, 1954 |